(12) United States Patent
Sizer

(10) Patent No.: US 7,021,202 B2
(45) Date of Patent: Apr. 4, 2006

(54) DISPOSABLE FRYING PAN INSERT

(76) Inventor: Latoya E. Sizer, P.O. Box 49, Fort Lewis, MD (US) 20755

( * ) Notice: Subject to any disclaimer, the term of this patent is extended or adjusted under 35 U.S.C. 154(b) by 127 days.

(21) Appl. No.: 10/682,338

(22) Filed: Oct. 10, 2003

(65) Prior Publication Data

US 2005/0076793 A1    Apr. 14, 2005

(51) Int. Cl.
*A47J 37/12* (2006.01)

(52) U.S. Cl. .............. 99/415; 99/418; 99/449; 99/447; 220/573.2; 220/912

(58) Field of Classification Search ........... 99/403, 99/407, 408, 415, 418, 449, 446, 447; 220/573.2, 220/573.4, 573.1, 573.5, 912
See application file for complete search history.

(56) References Cited

U.S. PATENT DOCUMENTS

| | | | |
|---|---|---|---|
| 2,174,425 A | 9/1939 | Schlumbohm | |
| 2,541,094 A | 2/1951 | Presenti | |
| 3,799,048 A | 3/1974 | Finley | |
| 4,320,699 A * | 3/1982 | Binks | ........... 99/349 |
| 4,828,134 A | 5/1989 | Ferlanti | |
| 5,323,693 A | 6/1994 | Collard et al. | |
| 5,706,721 A | 1/1998 | Homes | |
| 6,182,557 B1 | 2/2001 | Wilk | |
| 6,313,446 B1 * | 11/2001 | Jones | ........... 219/433 |
| 6,591,741 B1 * | 7/2003 | Martin | ........... 99/408 |
| 6,706,303 B1 * | 3/2004 | Fawson | ........... 426/523 |

* cited by examiner

*Primary Examiner*—Reginald L. Alexander
(74) *Attorney, Agent, or Firm*—Richard C. Litman

(57) ABSTRACT

A disposable pan, pot, or kettle liner system for deep-frying foods and includes a disposable pot liner and a disposable strainer fitting into the pot liner made of thin aluminum, aluminum alloy or other metal material having a stiffness adequate to be free-standing upon filling with cooking oil and heating to cooking temperatures while being sufficiently inexpensive to be disposable after use. The strainer is made of similar material and fits within the liner, holding foods to be cooked, and has a circular, flange-like upper rim extending upward, beyond the rim of the liner, to serve as a handle for lifting and straining the cooked food from the liner. The inventive disposable system is designed to be used within a non-disposable pot or kettle, but is freestanding. The system may also be used as a stand-alone unit directly on a heating surface such as a stove heating element.

7 Claims, 3 Drawing Sheets

DISPOSABLE FRYING PAN INSERT

BACKGROUND OF THE INVENTION

1. Field of the Invention

The present invention relates to cooking utensils. More specifically, the present invention relates to a disposable deep-frying pot liner and strainer.

2. Description of the Related Art

The use of deep-frying pots or kettles is known to result in a messy cleanup after use. It would be desirable to provide a disposable pot liner and strainer to carry out the frying operation which may be merely disposed of without the frying oil reaching the permanent pot kettle. This allows the carrying out of deep-frying without the messy cleanup of the non-disposable pot or kettle.

U.S. Pat. No. 2,174,425, issued Sep. 26, 1936, to Schlumbohm, describes disposable foil frying pans which may be held in a hinged frame for use or fit within a non-disposable frying pan as a liner.

U.S. Pat. No. 2,541,094, issued Feb. 13, 1951, to Pesenti, describes a combined aluminum frying pan cover and colander.

U.S. Pat. No. 3,799,048, issued Mar. 26, 1974, to Finley, describes a disposable cooking utensil having two shells arranged for even cooking.

U.S. Pat. No. 4,320,699, issued Mar. 23, 1982, to Binks, as seen in FIG. 8, describes a deep-fry pot having a disposable foil liner and a non-disposable strainer disposed therein.

U.S. Pat. No. 4,828,134, issued May 9, 1989, to Ferlanti, describes a cooking vessel having disposable, peel-off liners.

U.S. Pat. No. 5,323,693, issued Jun. 28, 1994, to Collard et al., describes a combination frying pan and fat draining insert, neither of which is designed to be disposable.

U.S. Pat. No. 5,706,721, issued Jan. 13, 1998, to Homes, describes a perforated food drainer fitting within an opened food can for draining packing fluid.

U.S. Pat. No. 6,182,557, issued Feb. 6, 2001, to Wilk, describes a frying pan having an insert for food warming or holding functions, neither the pan or insert being designed to be disposable.

None of the above inventions and patents, taken either singly or in combination, is seen to describe the instant invention as claimed. Thus, a disposable frying pan insert and strainer system solving the aforementioned problems is desired.

SUMMARY OF THE INVENTION

The present invention is a disposable pan, pot, or kettle liner system for deep-frying foods. The system has a disposable pot liner and a disposable strainer fitting into the pot liner. The pot liner and strainer are preferably made of thin aluminum, aluminum alloy or other metal material having a stiffness adequate to retain its shape upon filling with frying oil and heating to cooking temperatures while being sufficiently inexpensive to be disposable after use.

The strainer is made of similar material and fits within the liner, holding foods to be cooked, and has a circular, flange-like upper rim extending upward, beyond the rim of the liner, to serve as a handle for lifting and straining the cooked food from the liner. The inventive disposable system is designed to be used within a non-disposable pot or kettle, but stands on its own, thus not requiring that it closely fit any particular shape or dimensions as long as the pot is of sufficient size for the system to fit within the walls thereof. The system may also be used as a stand-alone unit directly on a heating surface such as a stove heating element.

Accordingly, it is a principal object of the invention to provide a system to allow deep-frying without the usual cleanup.

It is another object of the invention to provide a system as above which is designed to be disposable after use.

It is a further object of the invention to provide a disposable deep-frying system as above which can be used within a non-disposable pot or kettle.

Still another object of the invention is to provide a disposable deep-frying system as above which consists of a disposable liner and a disposable strainer fitting therein during use.

Yet another object of the invention is to provide a disposable deep-frying system as above which may be used directly on a source of heat such as a stove heating element.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a deep-fry disposable pot liner system having a disposable pot liner and a disposable strainer to fit within the pot liner.

Figure 1:
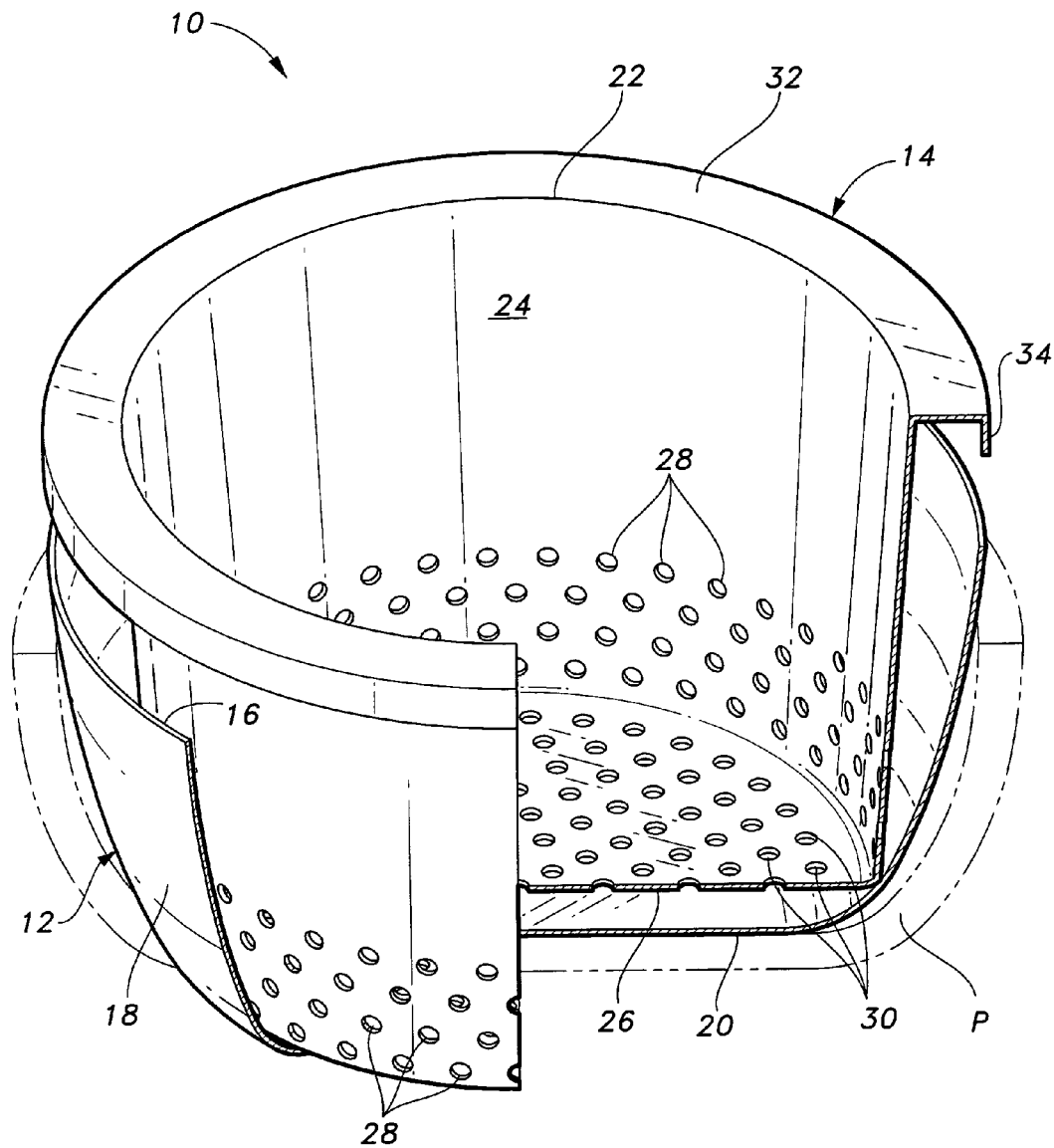
FIG. 1 is an environmental, perspective view, partially broken away of a disposable deep-fry pot insert system according to the present invention.
Figure 2:
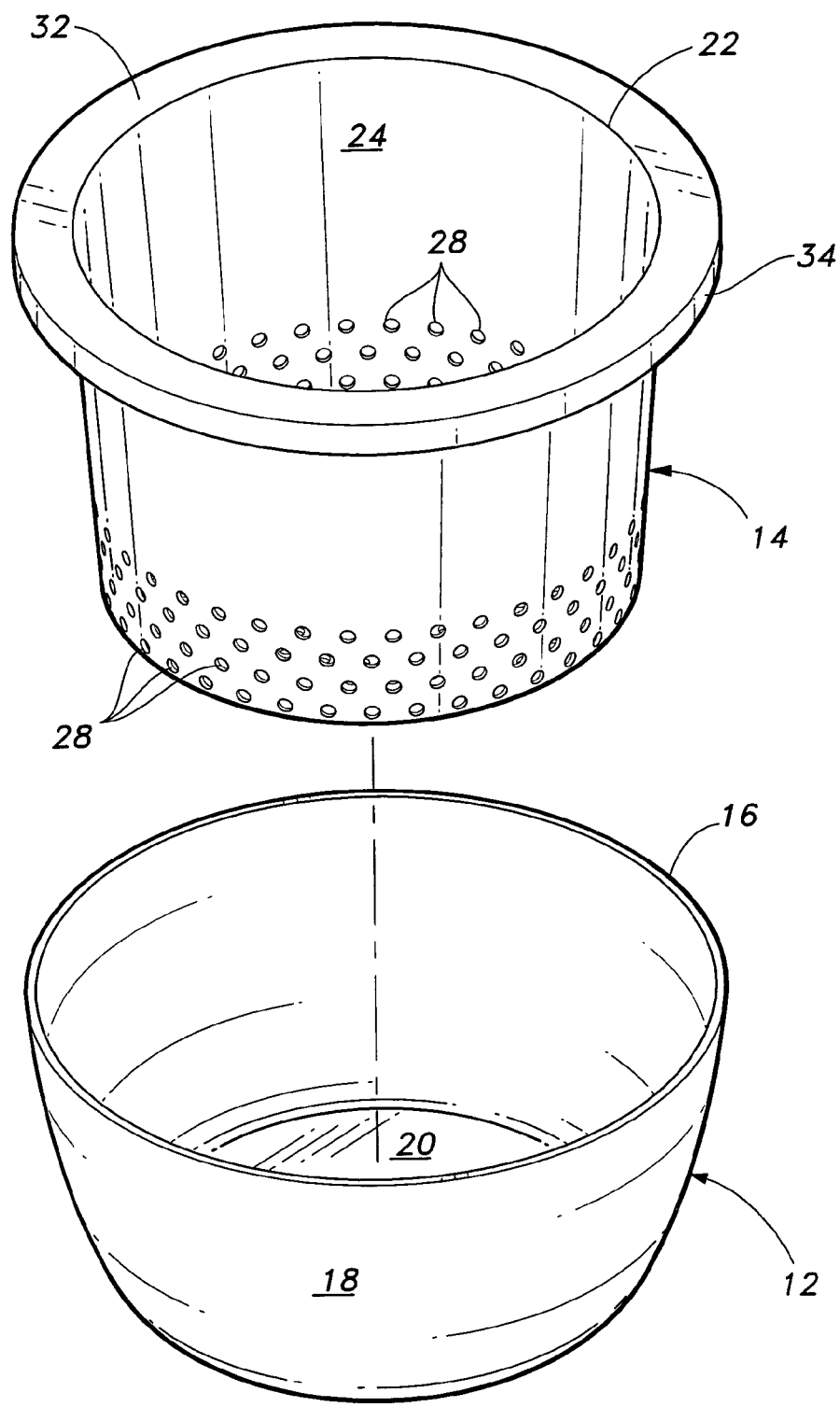
FIG. 2 is an exploded view of the disposable deep-fry pot insert system of FIG. 1.

Referring to FIGS. 1 and 2, there is shown the disposable deep-fry pot insert system of the present invention and generally referred to by the reference number 10. Insert system 10 has a disposable freestanding liner 12 resting in non-disposable pan, pot, or kettle P. Although liner 12 may be made to fit the inner contours of the non-disposable pot or kettle P, it is constructed of material of adequate stiffness to remain free-standing within the pot or kettle, thereby avoiding the need to have a special liner for each design of container as long as it is of adequate dimensions to receive the disposable liner 12. Disposable insert system 10 includes a disposable strainer 14 made of similar material and sized and dimensioned so as to fit within the liner 12.

Disposable liner 12 has an upper rim 16 having a cylindrical sidewall 20 curving inward to a flat, horizontal bottom wall 20 which rests on the inner side of the bottom wall of pot or kettle P (shown in ghost lines). The strainer 14 has an upper rim 22, preferably extending above liner upper rim 16 when engaging liner 12. Strainer 14 has a vertical cylindrical sidewall 24 extending downward from rim 16 and ending in a flat, horizontal bottom wall 26.

The lower end of strainer sidewall 24 preferably rests the curved of liner against the inwardly curved portion of liner sidewall 18 leaving strainer bottom wall 26 spaced upward from the liner bottom wall 20. Similarly, in this configuration, strainer sidewall 24 is spaced inwardly from liner sidewall 18. Strainer rim 22 has a horizontally disposed, circumferential flat portion 32 extending outward from said strainer sidewall and a depending portion 34 extending downward from the outer circumference of rim 22, the circumferential flat portion and depending portion serving as a handle from lifting strainer 14 from liner 12 when removing and draining cooked food from cooking oil contained in liner 12.

It is contemplated by the present invention, however, that strainer 14 may be sized such as to fully rest on the horizontal bottom wall 20 of the liner 12, or, alternatively, strainer 14 may be sized such that its sidewall 24 engages the inner side of liner sidewall 20 in a nesting arrangement. Although not specifically shown, these arrangements may easily be ascertained by observing FIG. 1.

As seen in FIGS. 1 and 2 strainer 14 has straining holes 28 through the lower portion of the outer wall 24 and straining holes 30 through bottom wall 26 to allow liquid cooking oil to drain from the strainer when removing the cooked food. The holes 28 and 30 are preferably about ¼ inch in diameter.

Figure 3:
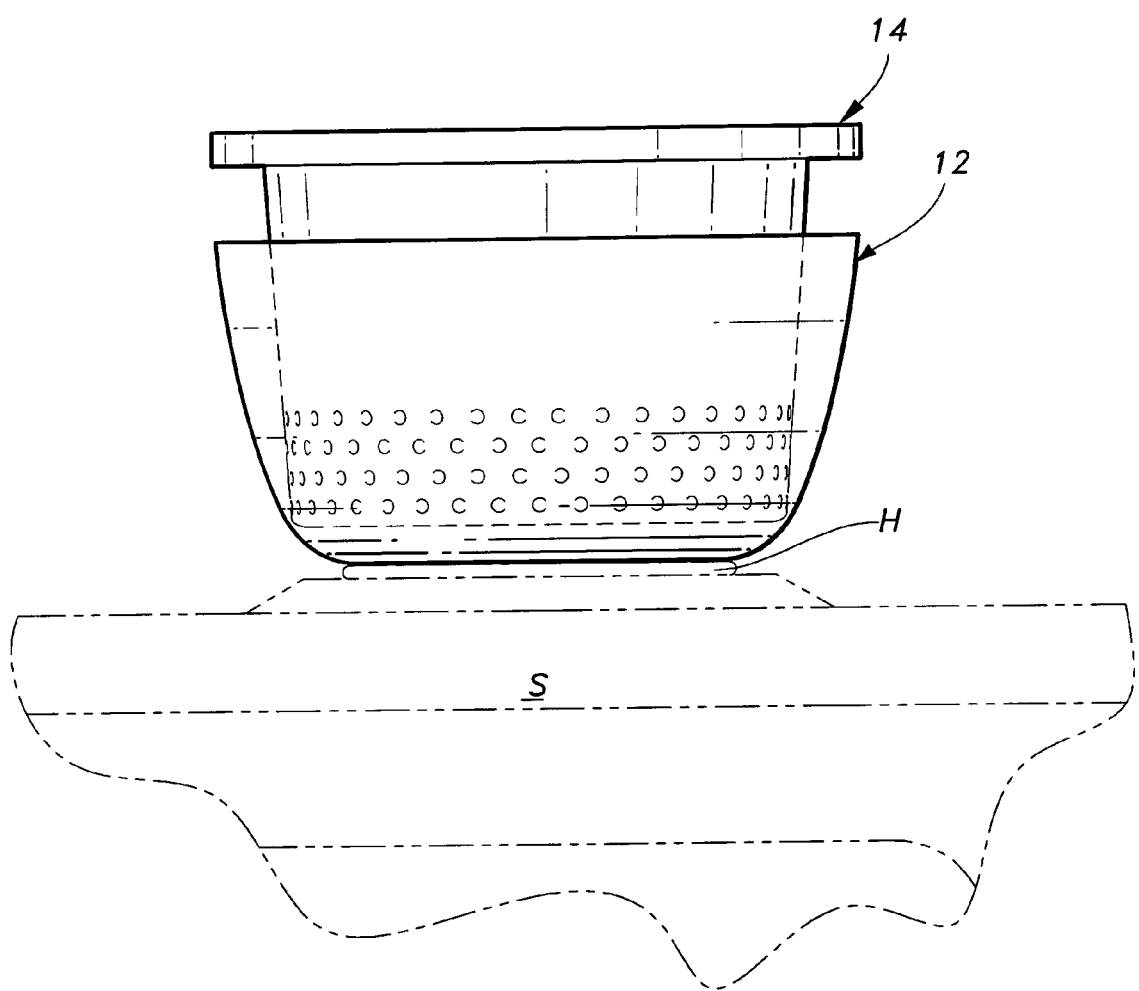
FIG. 3 is a side elevation view of the disposable deep-fry insert system as used directly on a stove heating element.

Referring to FIG. 3, the disposable liner 12 with the strainer 14 may be placed directly on the heating element H of stove S if desired. The system may then be used for cooking and then disposed of without the use of a non-disposable pot.

It is to be understood that the present invention is not limited to the embodiments described above, but encompasses any and all embodiments within the scope of the following claims.

I claim:

1. A disposable deep-fry pan insert system comprising:
a single-use, disposable pan liner having a bottom wall and a sidewall with an upper rim, said pan liner sidewall having a tapered portion tapering inward to join said pan liner bottom wall, said disposable pan liner sized and configured to rest within a non-disposable pot, pan or kettle and being freestanding within said non-disposable pot, pan or kettle;
a disposable strainer having a sidewall, an upper rim, and a bottom wall; said strainer bottom wall defining a plurality of apertures for draining cooking oil from cooked food within said strainer; said strainer having at least one handle near said upper rim of said strainer for removing said strainer from said pan liner;
said disposable strainer being so sized and configured as to be removably inserted into said disposable liner by use of said handle;
wherein said strainer sidewall meets said strainer bottom wall at about a right angle and said strainer is of such size and configuration as to rest on said tapered portion of said disposable pan liner sidewall.

2. The insert system of claim 1 wherein said strainer sidewall has a lower portion defining a plurality of apertures for draining of cooking oil from cooked food therein; said strainer sidewall being spaced inward from said liner sidewall; said strainer bottom wall being spaced from said liner bottom wall.

3. The insert system of claim 2, wherein said strainer sidewall extends above said rim of said disposable liner.

4. The insert system of claim 3, wherein said strainer rim includes a horizontally disposed, circumferential flat portion extending outward from said strainer sidewall and a depending portion extending downward from the outer circumference of said flat portion, said flat portion and said depending portion serving as a handle for removing said strainer from said liner when removing cooked food from cooking oil disposed therein.

5. The insert system of claim 1, wherein each of said disposable liner and said disposable strainer are made of thin, stiff aluminum.

6. A disposable deep-fry pan insert system comprising:
a single-use, disposable pan liner having a bottom wall and a sidewall with an upper rim, said pan liner sidewall having a tapered portion tapering inward to join said pan liner bottom wall;
a disposable strainer removably inserted within said pan liner, said strainer having a bottom wall and a sidewall with an upper rim;
said strainer bottom wall defining a plurality of apertures for draining cooking oil from cooked food within said strainer,
said strainer sidewall having a lower portion defining a plurality of apertures for draining of cooking oil from cooked food therein and said strainer sidewall being spaced inward from said liner sidewall,
said strainer sidewall extending above said rim of said disposable liner,
said strainer upper rim including a horizontally disposed, circumferential flat portion extending outward from said strainer sidewall and a depending portion extending downward from the outer circumference of said flat portion; wherein
said flat portion and said depending portion serving as a handle for removing said strainer from said pan liner when removing cooked food from cooking oil disposed therein.

7. The insert system of claim 6, wherein said disposable liner is freestanding and is usable directly on the heating element of a stove.

* * * * *